United States Patent
Meek et al.

(10) Patent No.: US 7,259,613 B2
(45) Date of Patent: Aug. 21, 2007

(54) METHOD OF FORMING A FLOATING CHARGE PUMP AND STRUCTURE THEREFOR

(75) Inventors: Stephen Meek, Phoenix, AZ (US); Alan R. Ball, Gilbert, AZ (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 0 days.

(21) Appl. No.: 11/355,161

(22) Filed: Feb. 16, 2006

(65) Prior Publication Data
US 2006/0132222 A1 Jun. 22, 2006

(51) Int. Cl.
*G05F 1/10* (2006.01)

(52) U.S. Cl. .................................... 327/536

(58) Field of Classification Search ............... 327/535, 327/536, 537
See application file for complete search history.

(56) References Cited

U.S. PATENT DOCUMENTS 6,229,385 B1 * 5/2001 Bell et al. .................. 327/565
6,392,904 B1 * 5/2002 Bayer et al. ................ 363/59

* cited by examiner

*Primary Examiner*—Jeffrey Zweizig
(74) *Attorney, Agent, or Firm*—Robert F. Hightower

(57) ABSTRACT

In one embodiment, a capacitor of a charge pump circuit is referenced to a high side voltage or top voltage rail.

2 Claims, 3 Drawing Sheets

METHOD OF FORMING A FLOATING CHARGE PUMP AND STRUCTURE THEREFOR

The present application is based on prior U.S. application Ser. No. 10/811,050, filed on 29 Mar. 2004, now U.S. Pat. No. 7,034,602, which is hereby incorporated by reference, and priority thereto for common subject matter is hereby claimed.

BACKGROUND OF THE INVENTION

The present invention relates, in general, to electronics, and more particularly, to methods of forming semiconductor devices and structure.

In the past, the semiconductor industry utilized various methods and structures to form charge pump circuits. A charge pump circuit generally was a circuit that received a voltage and produced an output voltage that was greater than the received voltage value. In some cases, the output voltage was inverted to create a negating voltage from a positive voltage source. FIG. 1 generally illustrates a typical prior art charge pump circuit 100. The prior charge pump circuit 100 received a voltage between a voltage input 102 and a ground reference 101. An oscillator power supply 104 generated a voltage which was used by an oscillator 103. Oscillator 103 provided a train of pulses that switched between ground potential 101 and the potential of generated by supply 104. The output of oscillator 103 charged a pump capacitor 107 which in turn charged an output capacitor 110 to produce an output voltage between an output 111 and ground 101. The output voltage was referenced to ground 101 and was a voltage approximately equal to the voltage on input 102 plus the voltage of the pulses of oscillator 103.

One problem with the prior art charge pump circuit was that the voltage across the output capacitor was referenced to ground. The ground reference prevented the prior art charge pump circuit from being used when a different type of reference was needed. Another problem was the value of the output voltage. When the input voltage changed, the value of the output voltage also increased. Thus the output voltage varied. Additionally, the voltage value of the pulses from oscillator 103 was fixed and could not easily be adapted for different values of input voltage 102. The fixed nature of the voltage of the pulses from oscillator 103 could not easily be changed regardless of the value of the input voltage.

Accordingly, it is desirable to have a charge pump circuit that is not referenced to ground, that can easily adapt the output voltage for different values of the input voltage, and that can easily change the voltage value of the pulses from the charge pump oscillator.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of a metal oxide semiconductor (MOS) transistor or an emitter or a collector of a bipolar transistor, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention.

DETAILED DESCRIPTION OF THE DRAWINGS

Figure 1:
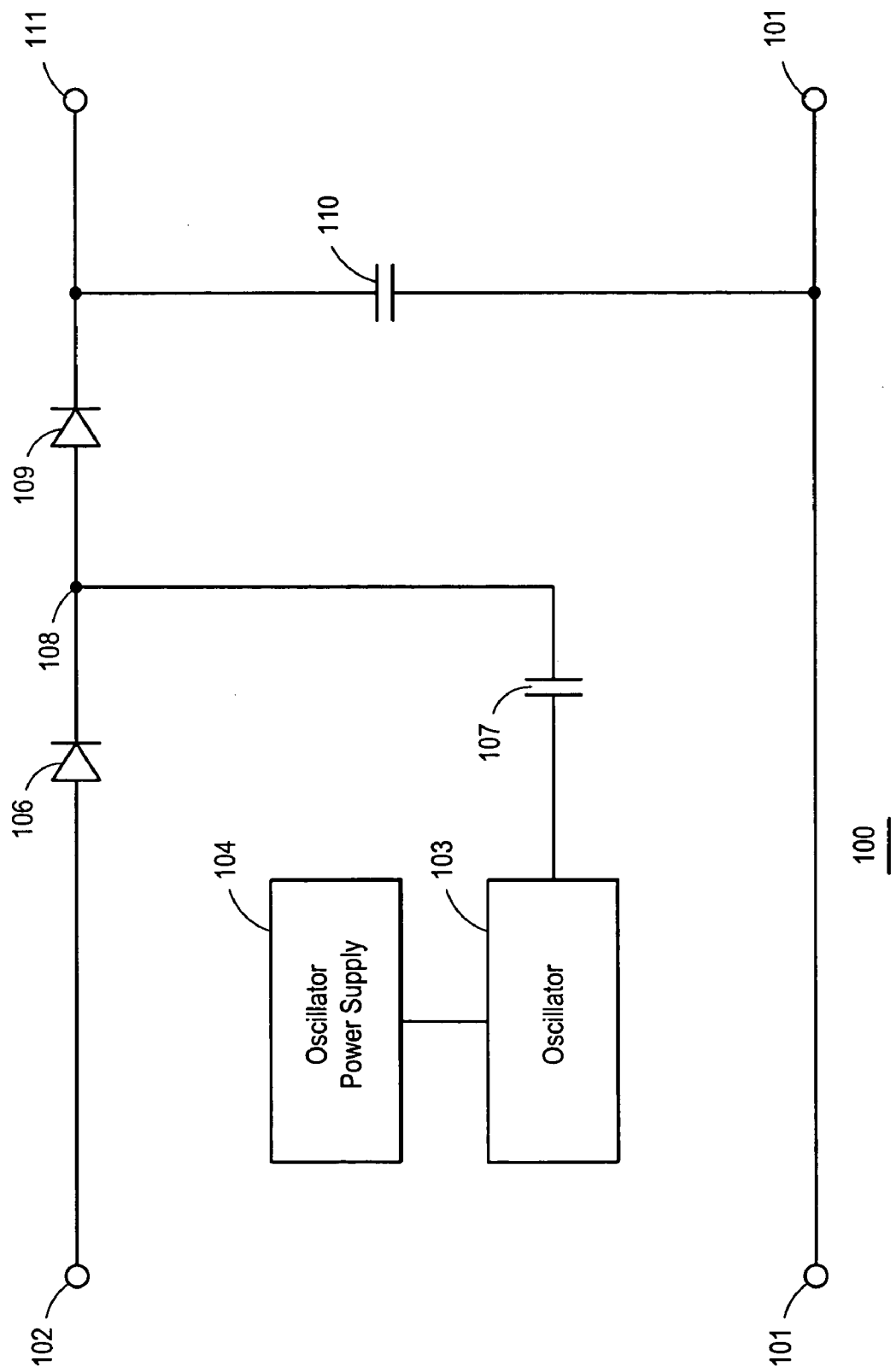
FIG. 1 generally illustrates a portion of a prior art charge pump circuit.
Figure 2:
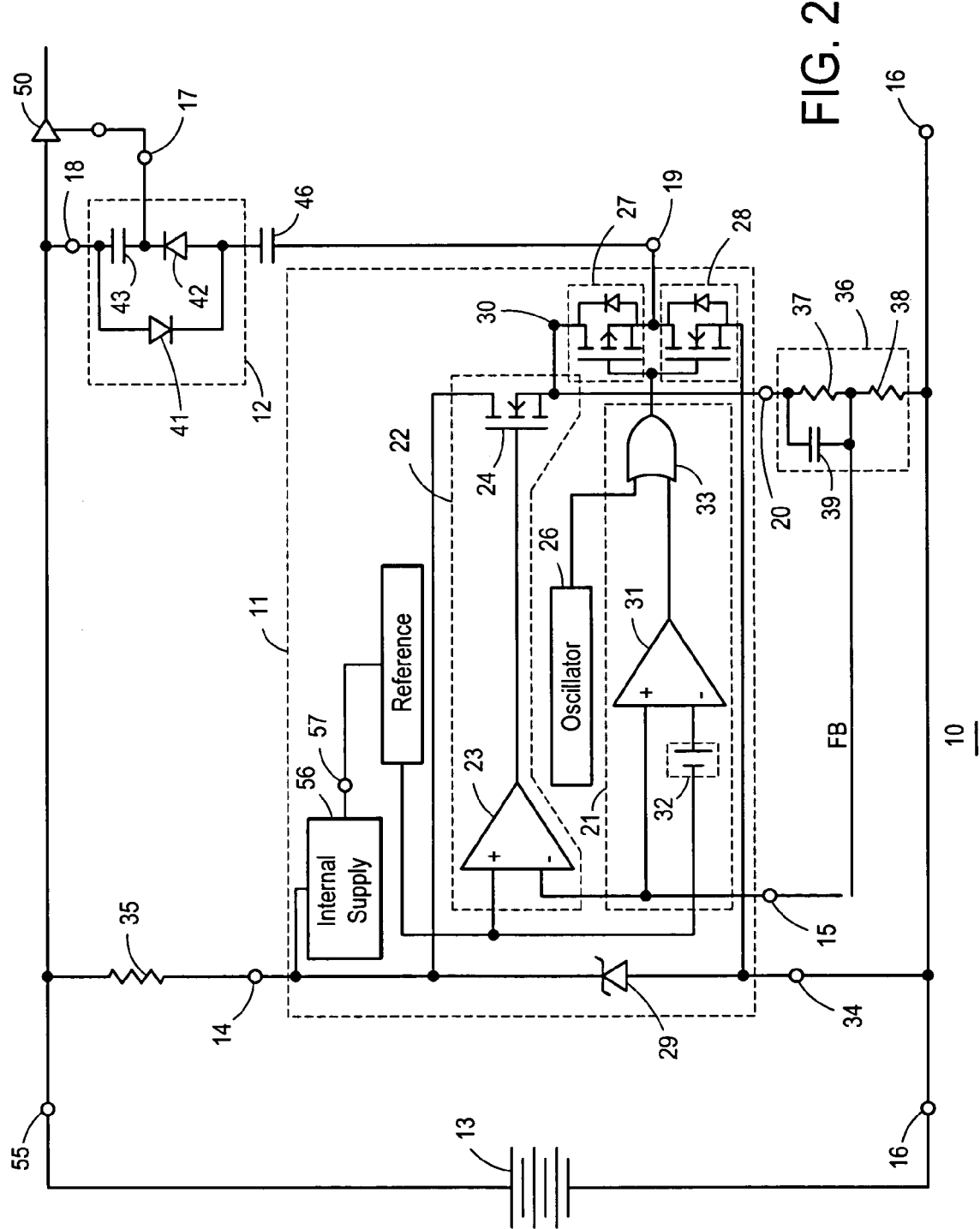
FIG. 2 schematically illustrates a portion of an embodiment of a charge pump circuit in accordance with the present invention.

FIG. 2 schematically illustrates an embodiment of a floating charge pump circuit 10 that provides an output voltage on an output 17 that floats with a value of an input voltage to circuit 10. The output voltage between output 17 and a voltage input 55 is formed to be a first voltage greater than the input voltage applied to circuit 10. Circuit 10 receives the input voltage from a voltage source 13 between input 55 and a voltage return 16. Circuit 10 forms the output voltage between output 17 and input 55 to be greater than the input voltage applied to input 55 by a value of a first voltage. The output voltage on output 17 is referenced to the high side voltage or upper rail or the voltage of input 55. When the input voltage changes, the output voltage between input 55 and output 17 remains offset from the input voltage by the first voltage value, thus, the output voltage is always the first voltage value greater than the input voltage. The value of the first voltage is selectable as will be seen in more detail hereinafter.

Circuit 10 includes a charge pump controller 11, a charge pump capacitor 46, a charge pump output circuit 12, a resistor 35, and a feedback network 36. A load 50 typically is coupled to receive the output voltage from circuit 10. For example, load 50 may be an O-Ring diode circuit that receives a control voltage from circuit 10 in order to implement the O-Ring function. One example of such an O-Ring circuit is a semiconductor device known as PIP401 which is available from Philips Semiconductors of Eindhoven, The Netherlands. Charge pump output circuit 12 includes a blocking diode 41, a charging diode 42, and an output capacitor 43. Circuit 12 is connected to the high side voltage or upper rail or input voltage at a terminal 18.

Controller 11 typically receives the input voltage between a voltage input 14 and a voltage return 34 of controller 11, and responsively provides a drive signal on an output 19. Voltage return 34 typically is connected to voltage return 16 of circuit 10. The voltage swing of the drive signal on output 19 has a maximum value that is established by a feedback (FB) signal received on a feedback input 15 of controller 11. Feedback network 36 includes a first feedback resistor 37 and a second feedback resistor 38 that are connected in series between a regulator output 20 of controller 11 and return 16. Network 36 also includes a capacitor 39 connected in parallel with resistor 37. As will be seen further hereinafter, the value of the output voltage between output 17 and input 55 is substantially equal to the maximum value of the voltage swing of the drive signal on output 19.

Controller 11 includes an internal supply 56, a reference voltage generator or reference 25, a voltage limiter or clamp 29, a voltage regulator 22, an oscillator 26, an over-charge protection circuit 21, and an output driver that includes an upper drive transistor 27 and a lower drive transistor 28. Regulator 22, circuit 21, and transistors 27 and 28 are identified in a general way by dashed boxes. In one embodiment, clamp 29 is a zener diode, but may be any circuit that limits the voltage on input 14 to a desired maximum value. In the preferred embodiment, clamp 29 is a thirty volt (30V) zener diode. In this preferred embodiment, oscillator 26 is formed to oscillate at a given frequency that typically is between about one hundred Kilo-Hertz and one Mega-Hertz (100 KHz-1 MHz). Over-charge protection circuit 21 includes a comparator 31, an OR gate 33, and an offset voltage or offset 32. Regulator 22 includes an error amplifier 23 and a regulator transistor 24. Clamp 29 along with resistor 35 clamp the maximum value of the voltage applied to input 14 in order to protect controller 11.

Supply 56 forms an internal operating voltage on an output 57 of supply 56. The internal operating voltage generally is used for operating amplifier 23, reference 25, oscillator 26, comparator 31, offset 32, and gate 33. Although not shown for simplicity of the drawing, supply 56 is connected between input 14 and return 34 to receive the voltage from input 14. Amplifier 23, reference 25, oscillator 26, comparator 31, offset 32, and gate 33 typically are connected to receive the regulated internal operating voltage between output 57 and return 34. Regulator 22 forms a regulated voltage at an internal voltage node 30. The regulated voltage on node 30 generally is used for generating a pump voltage on an output 19. The value of the regulated voltage produced at node 30 depends upon the value of the feedback voltage received on feedback input 15. In some embodiments, the internal operating voltage may be derived from the voltage on node 30 instead of from supply 56.

Amplifier 23 receives a reference voltage from reference 25 on a non-inverting input of amplifier 23, receives the feedback (FB) voltage on an inverting input, and responsively drives transistor 24 to provide the regulated voltage on node 30. The value of the regulated voltage on node 30 also establishes the upper or high value of the voltage swing of the drive signal on output 19. The value of resistors 37 and 38 are selected to provide the desired upper or high value of the drive signal on output 19. Transistors 27 and 28 of the output driver are connected in series between node 30 and return 34 in a totem pole for inverter configuration. In the preferred embodiment, transistors 27 and 28 are respectively a P-channel MOS transistor and an N-channel MOS transistor. When transistor 27 is enabled, output 19 is coupled to node 30 to provide the upper limit of the voltage swing of the drive signal on output 19. This upper limit is referred to as the pump voltage. Thus, the pump voltage is substantially equal to the value of the voltage on node 30. When transistor 28 is enabled, output 19 is coupled to return 16 to provide a voltage that is substantially equal to the value of the voltage on return 16 as the lower limit of the voltage swing of the drive signal.

Assuming that the output of comparator 31 is low, oscillator 26 generates a series of pulses that is received by the driver circuit which responsively drives output 19 with an oscillating signal or alternating pulses to form the drive signal. When output 19 is low, diode 41 is forward biased and the input voltage on terminal 18 is coupled to a node 44 to apply substantially the input voltage to one plate of capacitor 46. When output 19 goes high, node 44 is driven to a voltage that is greater than the voltage on terminal 18 which reverse biases diode 41 and drives node 44 to a voltage that is substantially equal to the input voltage on terminal 18 plus the pump voltage on output 19. This forward biases diode 42 and applies the voltage from capacitor 46 to one side of capacitor 43. The resulting voltage across capacitor 43 is substantially the value of the pump voltage. Since capacitor 43 is referenced to the top rail or high side of the input voltage, the value of the output voltage between output 17 and input 55 is substantially the pump voltage. Since the voltage drop of diodes 41 and 42 is small compared to these voltage values, the drop of diodes 41 and 42 are ignored and the voltages are referred to as substantially equal in order to show that the diode drop is included. Thus, the output voltage across capacitor 43 is the pump voltage minus the drop of diodes 41 and 42.

For example, assume that feedback network 36 is selected to form a voltage of ten volts (10 V) on node 30 and that voltage source 13 is forty-eight volts (48 V). When output 19 is low, substantially forty-eight volts (48 V) is applied to node 44 and to the output plate of capacitor 46 through diode 41. As can be seen, the voltage on node 44 is forty-eight volts (48 V) minus the drop of diode 41. When output 19 goes high to ten volts (10 V), node 44 is driven to substantially fifty-eight volts (58 V). As can be seen, the substantially fifty-eight volts (58 V) is formed from the forty-eight volts (48 V) on terminal 18 plus the ten volts (10V) of output 19 minus the drop of diode 41. The substantially fifty-eight volts reverse biases diode 41 and forward biases diode 42, and substantially fifty-eight volts (58 V) is applied to one terminal of capacitor 43 through diode 42. The substantially fifty-eight volts (58 V) applied to capacitor 43 is formed from the substantially fifty-eight volts on node 44 applied by capacitor 46 minus the drop of diode 42. Since diode 42 is forward biased, capacitor 43 charges to substantially ten volts (10 V). As can be seen the substantially ten volts (10V) is ten volts minus the drop of diodes 41 and 42. Since capacitor 43 is referenced to the high side voltage, the output voltage on output 17 is substantially the ten volts (10V) across capacitor 43. This cycle of charging capacitor 43 continues for each cycle of oscillator 26.

It can be seen that output 17 follows the voltage applied to input 55. When the voltage applied to input 55 changes, that change is immediately applied to one side of capacitor 43. Since capacitor 43 is charged to a voltage substantially equal to the high level voltage swing of output 19, output 17 immediately follows that change in input 55 with the voltage on output 17 remaining the voltage across capacitor 43. Consequently, floating the charge pump by connecting the charge pump output capacitor to the high side voltage or upper rail or the voltage on input 55 allows the output voltage of circuit 10 to quickly follow any changes in the input voltage of the charge pump circuit.

Over charge protection circuit 21 facilitates protecting circuit 10 when circuit 10 is first energized or when there is a fast or rapid transisent on input 55. Comparator 31 compares the feedback voltage on input 15 to the reference voltage plus the value of offset 32. The value of offset 32 forms a protection value and generally is about ten percent (10%) of the value of the reference voltage provided by reference 25. Offset 32 may be external to comparator 31 or formed as an internal offset voltage. In either case, the voltage of offset 32 is a positive voltage that offsets the inverting input such that applying the same voltage to both inputs results in the inverting input receiving a voltage that is greater than the voltage received on the non-inverting input. In the preferred embodiment, offset 32 is designed into the inverting input of comparator 31. Such internal offset voltages are well known to those skilled in the art. If the feedback voltage on input 15 increases above the value of the reference voltage by more than the value of offset 32, the output of comparator 31 goes high which turns on transistor 28 and disables controller 11 from charging capacitors 46 and 43 thereby protecting the load connected to output 17 in addition to transistors 27 and 28 from an over-voltage condition.

In order to provide the functionality described herein, a first terminal of resistor 35 is connected to input 55 and a second terminal of resistor 35 is connected to input 14 of controller 11. Input 14 of controller 11 is connected to a cathode of zener diode 29 and an anode of diode 29 is connected to return 34. A drain of transistor 24 is connected to input 14 and a source of transistor 24 is commonly connected to node 30 and to output 20. A gate of transistor 24 is connected to the output of amplifier 23. A non-inverting input of amplifier 23 is connected to an output of reference 25, and an inverting input of amplifier 23 is commonly connected to a non-inverting input of comparator 31 and to input 15. An output of oscillator 26 is connected to a first input of gate 33 and a second input of gate 33 is connected to an output of comparator 31. An output of gate 33 is commonly connected to a gate of both transistors 27 and 28. A source of transistor 27 is connected node 30 and a drain of transistor 27 is commonly connected to output 19 and to a drain of transistor 28. A source of transistor 28 is connected to return 34. An inverting input of comparator 31 is connected to the non-inverting input of amplifier 23.

The first terminal of resistor 37 of feedback network 36 is commonly connected to a first terminal of capacitor 39 and to output 20 of controller 11 and a second terminal of resistor 37 is commonly connected to a first terminal of resistor 38, to a second terminal of capacitor 39, and to input 15. A second terminal of both resistor 38 is connected to return 16. A first terminal or lower plate of capacitor 46 is connected to output 19 and a second terminal or upper plate of capacitor 46 is commonly connected to an anode of diode 42 and to a cathode of diode 41. An anode of diode 41 is connected to terminal 18 and to a first terminal or input plate of capacitor 43. A second terminal or output plate of capacitor 43 is commonly connected to output 17 and to the cathode of diode 42.

Figure 3:
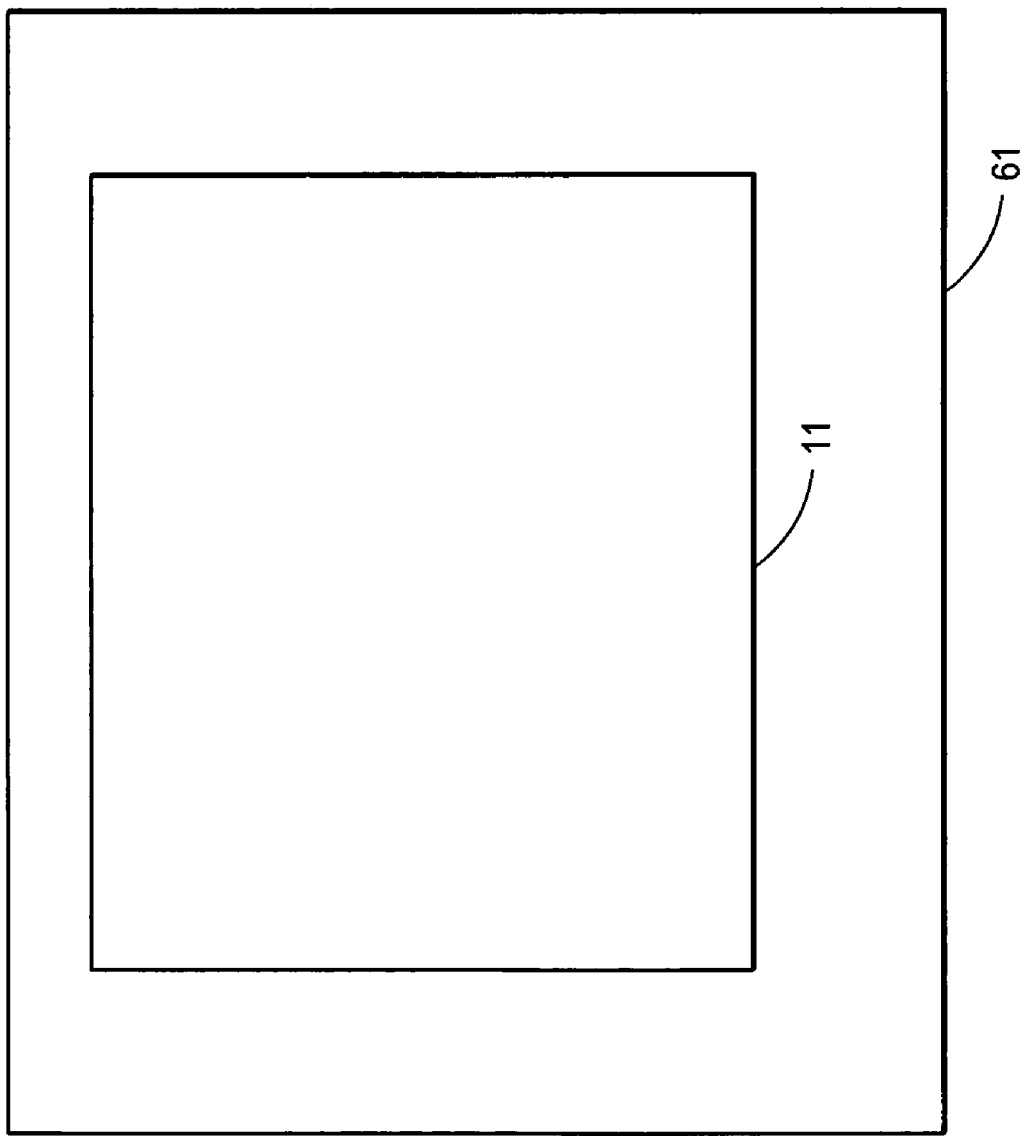
FIG. 3 illustrates an enlarged plan view of a semiconductor device incorporating portions of the charge pump circuit of FIG. 2 in accordance with the present invention.

FIG. 3 schematically illustrates an enlarged plan view of a portion of an embodiment of a semiconductor device 60 that is formed on a semiconductor die 61. Controller 11 is formed on die 61. Die 61 may also include other circuits that are not shown in FIG. 3 for simplicity of the drawing. Controller 11 and device 60 are formed on die 61 by semiconductor manufacturing techniques that are well know to those skilled in the art.

In view of all of the above, it is evident that a novel device and method is disclosed. Included, among other features, is forming a charge pump circuit to have an output that floats relative to an input voltage of the charge pump circuit. Referencing an output capacitor of the charge pump circuit to the high side voltage or top rail of the input voltage allows the output voltage to float relative to the ground reference or lower supply rail and be used for circuits that are not referenced to ground or the lower supply rail. Additionally, referencing the output capacitor to the top rail reduces the voltage across the capacitor thereby allowing for a lower breakdown voltage capacitor which reduces costs. The high side reference also reduces the voltage applied to the control circuits thereby allowing for lower breakdown semiconductor devices which also reduces costs.

While the invention is described with specific preferred embodiments, it is evident that many alternatives and variations will be apparent to those skilled in the semiconductor arts.

The invention claimed is:

1. A method of forming a charge pump controller comprising:
    forming a first input operable for receiving a feedback signal representative of an internal regulated voltage of the charge pump controller;
    coupling a voltage regulator to form the internal regulated voltage including coupling the voltage regulator to receive a reference voltage and coupling an amplifier to receive the reference voltage and the feedback signal and responsively drive a regulator transistor to generate the internal regulated voltage; and
    coupling the charge pump controller to disable generating a charge pump signal when the internal regulated voltage exceeds a protection value of the charge pump controller.

2. The method of claim 1 further including coupling a comparator to receive the reference voltage and disable generating the charge pump signal when the feedback signal exceeds the reference voltage by a first value.

* * * * *